Nov. 2, 1954 R. M. CRAYFORD 2,693,501

METHOD AND APPARATUS FOR TELEVISION CONVERSION

Filed Oct. 31, 1951

INVENTOR.
Robert M. Crayford.
BY Jay C. Taylor
ATTORNEY

United States Patent Office 2,693,501

Patented Nov. 2, 1954

2,693,501

METHOD AND APPARATUS FOR TELEVISION CONVERSION

Robert M. Crayford, Wayne, Mich.

Application October 31, 1951, Serial No. 254,157

9 Claims. (Cl. 178—69.5)

Figure 1:
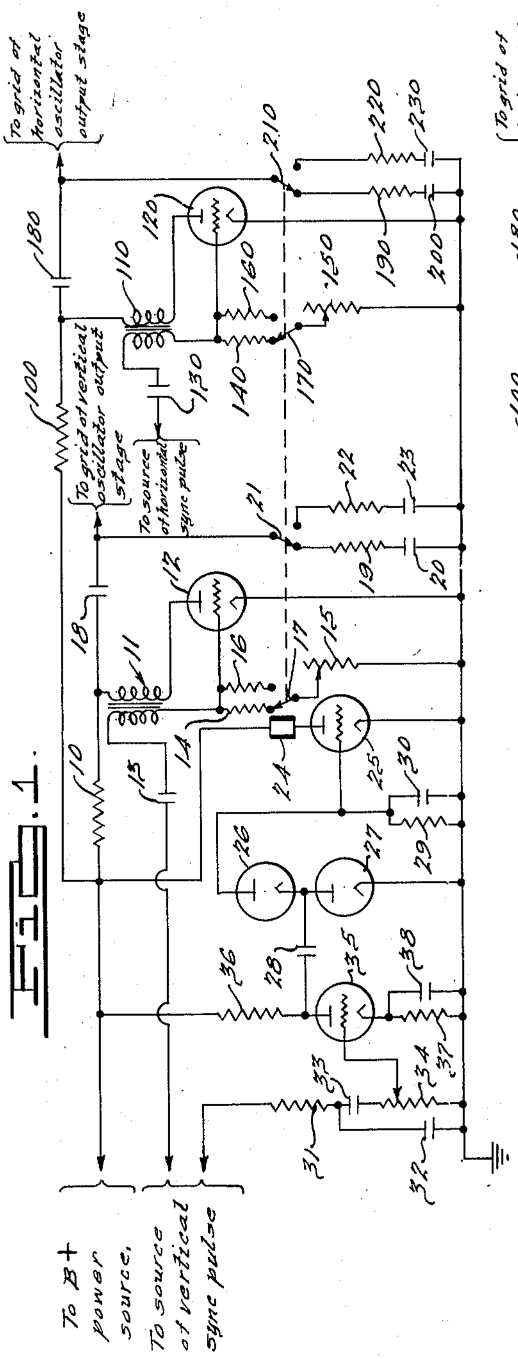

This invention relates to color television and has for its primary object the provision of a method and apparatus for automatically converting a television receiving set so as to project on its view plate an intelligible picture, regardless whether the picture transmission is at the rate employed for color or black-and-white broadcasts.

In accordance with one system of broadcasting color television, commonly referred to as C. B. S., complete picture fields are broadcast at the rate of 144 fields per second, whereas conventional black-and-white broadcasts occur at the rate of sixty fields per second, a field being defined as the interval in which the vertical oscillator of the set completes one cycle. For each cycle of the vertical oscillator, the horizontal oscillator of a set tuned for color reception completes 202½ cycles and 262½ cycles for a set tuned for black-and-white reception. Inasmuch as the vertical and horizontal oscillators of the receiving set must be synchronized exactly with the corresponding vertical and horizontal oscillators of the broadcast station in order to reproduce an intelligible picture, it is apparent that a receiving set adapted to receive black-and-white pictures will reproduce nothing intelligible during a color broadcast, the same being true with a receiving set adapted for color reception during a black-and-white program.

Prior to the present invention, various manually actuated switch devices have been available for installation on existing television receiving sets for selectively adapting the same for reception of either color or black-and-white broadcasts. However such installations have not been entirely satisfactory. From the standpoint of feasibility and convenience, the control switch for such a device should be located on the face of the set. The owner of an expensive and attractive television cabinet is often reluctant to permit a repair man to drill into the face of the cabinet for the purpose of installing an additional switch, so that the latter is usually located inconveniently at the rear of the cabinet. As a result, when a program changes from black-and-white to color, the cabinet must frequently be moved away from a wall to operate the conversion switch. Not only is part of the program lost in this conversion, but frequently when the broadcast changes, the audience will not immediately be aware of the cause of the unintelligible reception and will attempt to bring the set into adjustment by turning knobs and dials having no control over the difficulty. In consequence, an additional part of the program is lost. The location of the conversion switch either at the face or back of the cabinet also frequently gives rise to technical difficulties by reason of the distributed capacitance of electrical leads or conduits running from the switch to the associated parts of the television circuit and conversion circuit.

It is accordingly another object of the present invention to provide simple and improved means in cooperation with a television receiving set for automatically adapting the same to receive and reproduce black-and-white pictures regardless whether the set is tuned to a black-and-white or to a color broadcast.

Another object is to provide an improved completely automatic method for converting a television receiving set to receive either a black-and-white or a color broadcast, depending on which is being broadcast, without recourse to manual switches or adjustments, whereby the owner of the receiving set may enjoy the broadcast without giving a thought to or even knowing whether the broadcast was intended for color or black-and-white reception.

Still other objects are to provide a method and means of the foregoing nature which may be readily applied to existing television receiving sets with a minimum of modification and expense, and which avoids the aforesaid technical difficulties experienced with customary manually controlled conversion switches.

Other objects of this invention will appear in the following description and appended claims. It will be understood that the present invention is not limited in its application to specific procedures discussed herein, since the invention is capable of being practiced or carried out in various ways. Also it is to be understood that the phraseology or terminology employed herein is for the purpose of description and not of limitation.

A virtue of the fundamental concept of the method or procedure involving the present invention is its simplicity. When a black-and-white television broadcast is changed to color, for example, the frequencies of the broadcast synchronization signals or pulses for the horizontal and vertical oscillators of the receiving set are also abruptly changed. A frequency sensitive electromagnetic circuit is thus employed to detect the frequency change and to actuate an oscillator control circuit which adapts the two oscillators for oscillation at the changed frequencies. By way of example, either the broadcast vertical synchronization pulse or the horizontal synchronization pulse, commonly referred to respectively as the vertical sync pulse and horizontal sync pulse, may be employed. The repetition rate of the sync pulse employed is suitably applied to a vacuum tube in an operative circuit to affect the average cathode current of the tube, either increasing or decreasing the same as the sync pulse employed changes from the black-and-white frequency to the color frequency, or vice versa. The change in the aforesaid cathode current is thus applied to control an automatic change-over device, such as a multiple contact electromagnetic switch, so as to convert both the horizontal and vertical oscillator circuits to oscillate at the proper frequencies as required by the broadcast sync pulses and also to convert the associated step circuits for properly shaping the wave forms in the oscillator circuits as required at the associated oscillator out-put stages.

The frequency of either oscillator circuit may be readily changed in a number of ways well known to television technicians, by suitably altering one or more of the circuit components. Inasmuch as the usual step circuit merely comprises a condenser and resistor in series, a pair of these circuits may be provided with each oscillator circuit and selectively employed with the proper sync pulse frequency.

Figure 2:
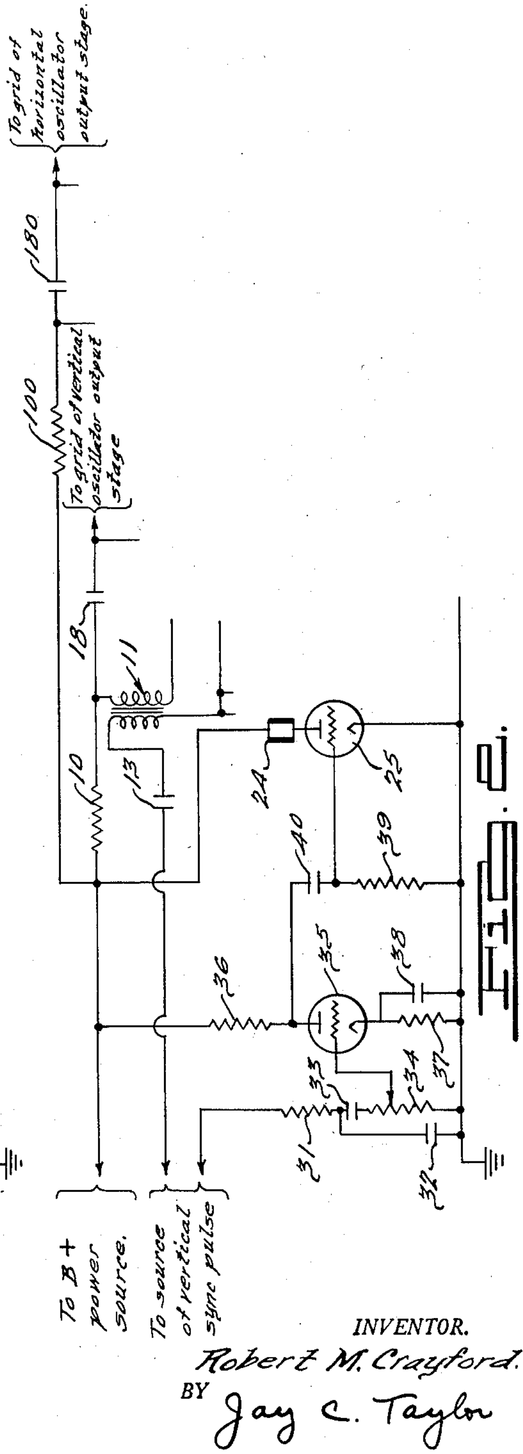

Referring to the drawings, Figs. 1 and 2 illustrate two simplified schematic circuits suitable for use in application of the present invention. In Fig. 1, typical circuits for the horizontal and vertical oscillators are shown. The B plus potential or power source is connected through resistor 10 to the secondary coil of transformer 11 and then to the anode or plate of triode vacuum tube 12. The cathode of triode 12 is connected to ground. The grid of triode 12 is connected through the primary of transformer 11 and coupling condenser 13 to a source of the vertical sync pulse, such as the plate of the sync separator circuit. The grid of tube 12 is also connected through resistor 14 and variable resistor 15 to ground. The latter resistor is varied by the customary vertical control knob at the face of the set. With the exception of the relay switch shown, the circuit discussed thus far is a conventional vertical oscillator circuit, which in a television set adapted to receive black-and-white programs, is tuned to oscillate at the frequency of the vertical sync pulse of a black-and-white broadcast.

It is apparent that by suitably altering one or more of the circuit components, as for example by replacing resistance 14 by a smaller resistance 16, the circuit is readily adapted to oscillate at the higher frequency of the vertical sync pulse of a color broadcast. Accordingly, a relay actuated switch 17, which normally connects resistances 14 and 15 in series, is provided for connecting resistances 15 and 16 in series and disconnecting resistance 14 from the circuit, whereby the oscillator circuit is tuned to oscillate at the frequency of the vertical sync pulse of a color broadcast.

The vertical oscillator circuit at a point common to resistance 10 and the secondary coil of the transformer 11 is connected through a coupling condenser 18 to the grid of a vertical oscillator output tube and also to ground through a step circuit comprising resistor 19 and condenser 20 in series. The latter circuit is also conventional and is provided to give the proper wave form or shape to the output of the vertical oscillator when the same is oscillating at the frequency of the vertical sync pulse of a black-and-white broadcast. When the vibration frequency of the vertical oscillator circuit is increased by connecting resistors 15 and 16, rather than resistors 14 and 15, the wave form or shape of the vertical oscillator output must be modified correspondingly, which is readily accomplished by means of relay actuated switch 21 and an alternative step circuit comprising resistance 22 and condenser 23 connected in series to ground. Switch 21 normally connects the coupling condenser 18 with step circuit 19, 20, but is operative to replace the latter circuit by step circuit 22, 23. Accordingly when both switches 17 and 21 are actuated to connect resistances 15 and 16 and to connect condenser 18 with the step circuit 22, 23, the set is completely adapted to respond to the vertical sync pulse of a color broadcast.

For the sake of simplicity in the present discussion, horizontal oscillator and step circuits are shown which are substantially the same as the vertical oscillator and step circuits and which may be modified similarly to adapt the set to respond to the horizontal sync pulse of a color broadcast. Other types of horizontal circuits are frequently employed which respond more efficiently to the horizontal sync pulse, but any of these circuits may be readily converted for use with either the black-and-white or the color frequency by suitably selecting circuit components of the proper values. In the horizontal circuits shown are resistor 100, transformer 110, triode 120, condenser 130, resistances 140, 150 and 160, relay actuated switch 170, coupling condenser 180, step circuit 190, 200, relay actuated switch 210, and alternative step circuit 220, 230, all arranged to function substantially in the same manner as their counterparts 10 through 23 in the vertical circuits. When the switches 170 and 210 are at their positions shown in Fig. 1, the set is adapted to respond to the horizontal sync pulse of a black-and-white broadcast. By actuating these switches to connect resistances 150 and 160 and to connect coupling condenser 180 with the alternative step circuit 220, 230, the set is completely adapted to respond to the horizontal sync pulse of a color broadcast.

The switches 17, 21, 170 and 210 are ganged to operate in unison, as indicated by the dashed line connecting these switches, and are actuated by a relay 24 in the plate circuit of a normally conducting vacuum tube triode 25 having its cathode connected to ground. The anode of tube 25 is connected through relay 24 to the B plus potential. Tube 25 is one component of a counter type circuit including in addition the diode vacuum tubes 26 and 27, coupling condenser 28, and resistor-condenser circuit 29, 30. Condenser 28 couples the cathode of tube 26 and anode of tube 27 in parallel with a source of the integrated vertical sync pulse as discussed below. The cathode of tube 27 is connected to ground to permit resetting of the circuit during each positive or high potential interval of the integrated sync pulse applied to condenser 28. The anode of tube 26 is connected to the grid of tube 25 and also to the parallel condenser 29 and resistor 30, which latter comprise a time delay and smoothing circuit connected in parallel to ground.

By virtue of the circuit shown, while tube 25 is conducting and relay 24 is energized, switches 17, 21, 170 and 210 are held in their positions shown in Fig. 1. During each negative or low potential interval of the integrated vertical sync pulse which is fed to the coupling condenser 28, tube 26 is caused to conduct, thereby to increase the positive charge on the cathode side of condenser 28 and to decrease the potential of the grid of tube 25 and the grid side of condenser 30. As a result, the cathode to anode current of tube 25 through relay 24 is reduced. This reduction in tube current through relay 24 for the short duration of a single sync pulse will have no applicable effect on the relay 24, by reason of the latter's mechanical and inductive inertia. During the succeeding positive or high potential interval of the integrated vertical sync pulse applied to condenser 28, tube 27 is caused to conduct to reduce the positive charge formerly applied to condenser 28 during the preceding negative interval and to reset the circuit for the next successive negative interval of the vertical sync pulse.

The time constant for the resistor-condenser circuit 29, 30 is predetermined so that the negative charge applied to the grid side of condenser 30 during each preceding negative or low potential interval of the vertical sync pulse applied at condenser 28 during a black-and-white broadcast will substantially leak through resistance 29 to ground before the next successive negative sync pulse interval. Thus the average negative or reduced charge on the grid of tube 25 during a black-and-white broadcast will be insufficient to de-energize relay 24.

Upon a change in the frequency of the vertical sync pulse from sixty fields per second to one hundred forty-four fields per second, however, the negative change on the grid of tube 25 caused by one vertical sync pulse will not be sufficiently dissipated before the next successive pulse to maintain the average cathode to anode current of tube 25 at the minimum value required to energize or actuate relay 24. Relay 24 will thus be de-energized and switches 17, 21, 170 and 210 will move to their respective alternative positions, as discussed above, to adapt the set for reception at the color sync pulse frequency. At the end of the color broadcast, the frequency of the vertical sync pulse will also drop, the current through tube 25 will rise, relay 24 will be energized, and switches 17, 21, 170, 210 will be returned to their respective positions for reception of the black-and-white broadcast.

By the foregoing, adaption of the set for reception of either a black-and-white or color broadcast is automatically accomplished in response to the frequency of the corresponding broadcast vertical sync pulse. It is apparent from the symmetry of the horizontal circuits that the horizontal sync pulse could also be employed to effect the automatic conversion. In fact the resulting circuit diagram would be substantially unchanged from that shown in Fig. 1. The integrator circuit 31, 32 could be eliminated. Otherwise the vertical circuits designated in Fig. 1 would merely be designated as the horizontal circuits, and vice versa. It is also to be noted that the specific reference above to the negative and positive intervals of the sync pulse is not critical to the present invention because the polarity may be readily reversed by means well known to the art. Likewise tube 25 may be normally non-conducting during the black-and-white broadcast and caused to conduct during the color broadcast. In this situation, relay switches 17, 21, 170, 210 will normally be at the positions shown in Fig. 1 when the relay 24 is de-energized.

In order to obtain positive actuation of relay 24 in the type of circuit shown, it will usually be desirable to amplify the sync pulse employed, depending of course upon the strength of the pulse. The vertical pulse may be taken from the same source that is fed to the primary of transformer 11, or from any other suitable source in the circuit of the receiving set. This pulse is then integrated in the integrator or step circuit shown comprising resistor 31 and condenser 32 connected in series between the ground and source of the pulse. The integrated pulse is taken from the circuit 31, 32 by means of a coupling condenser 33 connected between one end of a volume control resistor 34 and a point of the circuit 31, 32 located between the resistance 31 and condenser 32. The resistance 34 is connected at its other end to ground and is variably connected to the grid of a triode vacuum tube 35, which serves both to amplify and to reverse the polarity of the pulse applied to the condenser 28. The plate of tube 35 is connected to both condenser 28 and through a coupling resistor 36 to the B plus potential. The cathode of tube 35 is connected to ground through a self-bias circuit comprising resistance 37 and condenser 38 connected in parallel. Thus during the positive or high potential interval of the integrated vertical sync pulse applied to the grid of tube 35, the plate potential of that tube as well as the potential of the connected anode side of condenser 28 will decrease, causing tube 26 to conduct as aforesaid. During the negative or low potential interval of the integrated vertical sync pulse applied to the grid of tube 35, the anode potential of that tube and of the connected side of condenser 28 increases, causing tube 27 to conduct as aforesaid.

A preassembled conversion unit, comprising circuit 31, 32, condensers 33 and 28, resistors 34 and 36, circuit 37, 38, tubes 25, 26, 27 and 35, circuit 29, 30, relay 24, switches 17, 21, 170, 210, resistors 16 and 160, and alternate step circuits 22, 23 and 220, 230, may be readily connected with the existing circuits of most conventional television receiving sets within half an hour by a skilled technician. By virtue of the variable connection between the grid of tube 35 and the resistor 34, the preassembled unit may be properly connected as shown in Fig. 1 to the circuits of most conventional receiving sets without other modification of either the set or the preassembled unit. In the event that particular difficulties arise in the reception or reproduction of the televised picture on the view plate of the picture tube as a result of capacitance or inductive effects between long leads or conductors of the preassembled unit and circuit components of the existing set, a pair of small relays connected in series may replace the single relay 24, one relay of the pair being located near the vertical components of the circuit to operate switches 17 and 21, and the other relay being located near the horizontal components of the circuit to operate switches 170 and 210.

Referring to Fig. 2, another type of circuit suitable for actuating relay 24 in response to the frequency of either the vertical or horizontal sync pulse is illustrated. The vertical and horizontal circuits are the same as in Fig. 1 and are accordingly not duplicated in Fig. 2. The only change is the replacement of the aforesaid counter type circuit by a grid leak circuit comprising a resistance 39 connecting the grid of tube 25 to ground and also comprising a condenser 40 connecting the grid of tube 25 to the anode of tube 35. In this construction, when the grid of tube 35 is negative during the negative or low potential interval of the integrated sync pulse applied to that grid, the potential of the plate of tube 35 and of the grid of tube 25 increases, causing a grid current in tube 25 which entraps a negative charge on the grid side of condenser 40. Thereafter the cathode to anode current of tube 25 through relay 24 is cut off until the negative charge trapped on condenser 40 leaks to ground through resistance 39, or until the negative or low potential interval of the next successive sync pulse. The time constant of the resistor condenser circuit 39, 40 is determined so that, during a black-and-white broadcast, the aforesaid negative charge trapped on condenser 40 during each sync pulse will leak substantially to ground before the next pulse. As a result, the average negative grid charge of tube 25 will be insufficient during a black-and-white broadcast to cause relay 24 to be de-energized. However when the frequency of the sync pulse is increased to 144 fields per second during a color broadcast, the average negative grid charge of tube 25 will be sufficient to cause relay 24 to be de-energized. Switches 17, 21, 170 and 210 will then move to the position for reception at the color frequency.

I claim:

1. In a television receiving set having vertical and horizontal oscillator and step circuits and being adapted for use with one system of vertical and horizontal synchronizing pulses broadcast with a picture signal and distinctive thereof, converter circuit means adapted to be coupled with components of said set to adapt the same for use with a second system of vertical and horizontal synchronizing pulses broadcast with a second picture signal and distinctive thereof, switch means operative to couple said converter circuit means with said components, electromagnetic circuit means adapted to be actuated to operate said switch means, and pulse sensitive circuit means responsive to synchronizing pulses of said second pulse system for actuating said electromagnetic circuit means to operate said switch means and being coupled with said set to receive the synchronizing pulses therefrom.

2. In a television receiving set adapted for use with one system of synchronizing pulses broadcast with a picture signal and distinctive thereof, converter circuit means adapted to be coupled with components of said set and cooperable therewith to adapt the same for use with a second system of synchronizing pulses broadcast with a second picture signal and distinctive thereof, control circuit means effective to couple said converter circuit means with said components, and pulse sensitive circuit means coupled with said set to receive said synchronizing pulses therefrom and effective in response to said second system of synchronizing pulses to actuate said control circuit means to couple said converter circuit means with said components.

3. In a television receiving set adapted for use with one system of synchronizing pulses broadcast with a picture signal and distinctive thereof, converter circuit means adapted to be coupled with components of said set and cooperable therewith to adapt the same for use with a second system of synchronizing pulses broadcast with a second picture signal and distinctive thereof, a control circuit for said converter circuit means having a control element and coupled with said converter circuit means to operate the latter upon the application of a predetermined bias potential to said control element, an integrator circuit coupled with said set to integrate the vertical synchronizing pulses received by said set, and a frequency sensitive circuit coupled with said integrator circuit and control element and responsive to the frequency of the integrated vertical synchronizing pulses of said second system of pulses to apply said predetermined bias potential to said element.

4. In a television receiving set adapted for use with one system of synchronizing pulses broadcast with a picture signal and distinctive thereof, converter circuit means adapted to be coupled with components of said set and cooperable therewith to adapt the same for use with a second system of synchronizing pulses broadcast with a second picture signal and distinctive thereof, a control circuit for said converter circuit means having a control element and coupled with said converter circuit means to operate the latter upon the application of a predetermined bias potential to said control element, and frequency sensitive circuit means coupled with said control element and responsive to the frequency of pulses in said second system of synchronizing pulses to apply said predetermined bias potential to said element, said frequency sensitive circuit including a diode, a resistor-condenser circuit coupled with said diode and element to bias the latter responsive to conduction of said diode, a second diode in a clamper circuit, a coupling condenser connecting said set and diodes to transmit synchronizing pulses to the latter, said first diode being conductive upon the transmission thereto of a synchronizing pulse of a predetermined polarity, and the second diode being conductive intermediate the transmission of successive synchronizing pulses of said predetermined polarity to reset said coupling condenser for transmission of the next successive synchronizing pulse of said predetermined polarity.

5. In a television receiving set adapted for use with one system of synchronizing pulses broadcast with a picture signal and distinctive thereof, converter circuit means adapted to be coupled with components of said set and cooperable therewith to adapt the same for use with a second system of synchronizing pulses broadcast with a second picture signal and distinctive thereof, a control circuit for said converter circuit means having a control element and coupled with said converter circuit means to operate the latter upon application of a predetermined bias potential to said control element, an integrator circuit coupled with said set to integrate the vertical synchronizing pulses, an amplifier circuit coupled with said integrator circuit to amplify the integrated pulses, a diode, a resistor-condenser circuit coupled with said diode and element to bias the latter responsive to conduction of said diode, a second diode in a clamper circuit, a coupling condenser connecting said amplifier circuit and diodes to transmit the amplified pulses to the latter, said first diode being conductive upon the transmission thereto of an amplified pulse of a predetermined polarity, and the second diode being conductive intermediate the transmission of each amplified pulse of said predetermined polarity to reset said coupling condenser for transmission of the next successive amplified pulse of said predetermined polarity.

6. In a television receiving set having vertical and horizontal oscillator and step circuits adapted for use with one system of vertical and horizontal synchronizing pulses broadcast at predetermined frequencies with the picture signal, auxiliary vertical and horizontal oscillator and step circuit portions adapted to be coupled with components of said set and cooperable therewith to adapt the same for use with a second system of vertical and horizontal synchronizing pulses broadcast at different predetermined frequencies with a second picture signal, switch means operative to couple said circuit portions with said components, control circuit means having a control element and effective to operate said switch means upon the application of a predetermined bias potential to said control element, an integrator circuit coupled with said set to integrate vertical synchronizing pulses received by said set, an amplifier circuit coupled with said integrator circuit to amplify the integrated pulses, a resistor-condenser circuit coupled with said element to bias the same in accordance with the charge on the condenser of the latter circuit, a diode coupled with the latter circuit to charge the condenser thereof upon conduction of the diode, a coupling condenser connecting said amplifier circuit and diode to apply the amplified integrated pulses thereto, said diode being conductive upon the application of an amplified pulse of predetermined polarity thereto, and a second diode in a clamper circuit connected with said coupling condenser to receive said amplified pulses therefrom and being conductive intermediate the application of successive amplified pulses of said predetermined polarity to reset said coupling condenser for transmission of the next successive amplified pulse of said predetermined polarity, said resistor-condenser circuit being adjusted to bias said element at said predetermined bias potential upon the application of the amplified pulses to said first diode at the frequency of the integrated vertical synchronizing pulses of said second system of pulses.

7. In a television receiving set having vertical and horizontal oscillator and step circuits adapted for use with one system of vertical and horizontal synchronizing pulses broadcast at predetermined frequencies with the picture signal, auxiliary vertical horizontal oscillator and step circuit portions adapted to be coupled with components of said set and cooperable therewith to adapt the same for use with a second system of vertical and horizontal synchronizing pulses broadcast at different predetermined frequencies with a second picture signal, control circuit means having a control element and operative to couple said circuit portions with said components upon the application of a predetermined bias potential to said element, and a frequency sensitive biasing circuit coupled with said set to receive synchronizing pulses therefrom and also coupled with said element to bias the same as a function of the frequency of the pulses received from said set, said biasing circuit being adjusted to bias said element at said predetermined bias potential when the pulses received from said set are at the frequency of synchronizing pulses in said second system of pulses.

8. In a television receiving set having vertical and horizontal oscillator and step circuits adapted for use with one system of vertical and horizontal synchronizing pulses broadcast at predetermined frequencies with the picture signal, auxiliary vertical and horizontal oscillator and step circuit portions adapted to be coupled with components of said set and cooperable therewith to adapt the same for use with a second system of vertical and horizontal synchronizing pulses broadcast at different predetermined frequencies with a second picture signal, control circuit means having a control element and operative to couple said circuit portions with said components upon the application of a predetermined bias potential to said element, an integrator circuit coupled with said set to integrate the vertical synchronizing pulses received by said set, a resistor-condenser circuit coupled with said element to bias the same as a function of the pulse frequency applied to said resistor-condenser circuit, a diode coupled with said resistor-condenser circuit to transmit pulses thereto and being conductive upon the application thereto of an integrated pulse of a predetermined polarity, a coupling condenser coupling said integrator circuit and diode to transmit the integrated pulses to the diode, and a second diode in a clamper circuit connected with said coupling condenser to receive the integrated pulses therefrom, the second diode being conductive intermediate the application of successive integrated pulses thereto of said predetermined polarity to reset said coupling condenser for transmission of the next successive integrated pulse of said predetermined polarity, said resistor-condenser circuit being adjusted to bias said element at said predetermined bias potential upon the transmission of pulses thereto from said first diode at the frequency of the integrated vertical synchronizing pulses of said second system of pulses.

9. In a television receiving set having vertical and horizontal oscillator and step circuits adapted for use with one system of vertical and horizontal synchronizing pulses broadcast at predetermined frequencies with the picture signal, auxiliary vertical and horizontal oscillator and step circuit portions adapted to be coupled with components of said set and cooperable therewith to adapt the same for use with a second system of vertical and horizontal synchronizing pulses broadcast at different predetermined frequencies with a second picture signal, control circuit means having a control element and operative to couple said circuit portions with said components upon the application of a predetermined bias potential to said element, a resistor-condenser circuit coupled with said element to bias the same as a function of the pulse frequency applied to said resistor-condenser circuit, a diode coupled with said resistor-condenser circuit to transmit pulses thereto and being conductive upon the application thereto of a pulse of a predetermined polarity, a coupling condenser coupling said set and diode to transmit synchronizing pulses to the diode, and a second diode in a clamper circuit connected with said coupling condenser to receive the pulses therefrom, the second diode being conductive intermediate the application of successive pulses thereto of said predetermined polarity to reset said coupling condenser for transmission of the next successive pulse of said predetermined polarity, said resistor-condenser circuit being adjusted to bias said element at said predetermined bias potential upon the transmission of pulses thereto from said first diode at the frequency of synchronizing pulses of said second system of pulses.

References Cited in the file of this patent

UNITED STATES PATENTS

| Number | Name | Date |
|---|---|---|
| 2,539,465 | Parker | Jan. 30, 1951 |
| 2,546,972 | Chatterjea | Apr. 3, 1951 |
| 2,597,743 | Millspaugh | May 20, 1952 |